United States Patent [19]

Lin et al.

[11] Patent Number: 4,911,458
[45] Date of Patent: Mar. 27, 1990

[54] FOLDING BICYCLE

[76] Inventors: Chin C. Lin; Mao N. Lin, both of P.O. Box 1-79, Taipei, Taiwan, 10602

[21] Appl. No.: 293,630

[22] Filed: Jan. 5, 1989

[51] Int. Cl.$^4$ ............................................. B62F 15/00
[52] U.S. Cl. .................................. 280/278; 280/287; 403/102
[58] Field of Search ................... 280/278, 287; 403/92, 403/102, 161

[56] References Cited

U.S. PATENT DOCUMENTS

| | | | |
|---|---|---|---|
| 3,623,749 | 11/1971 | Jensen | 280/278 |
| 3,979,136 | 9/1976 | Lassiere | 280/278 |
| 4,284,288 | 8/1981 | Fulton | 280/278 |
| 4,422,663 | 12/1983 | Hon | 280/278 |

Primary Examiner—Charles A. Marmor
Assistant Examiner—Donn McGiehan
Attorney, Agent, or Firm—Lalos & Keegan

[57] ABSTRACT

An improved folding bicycle comprising a folding hinge mechanism as well as a set of foldable handle-bar and a collapsible seat structure. During normal use, the folding hinge mechanism is easily associated with multi-securing effect to ensure the safety of ride. While stored, it can be alternatively unlocked and separated manually, enabling the bicycle to be folded up for reducing the storing room. Furthermore, the set of handle-bar and saddle adjusting device can be used to simply adjust the dimensions of the bicycle to meet the requirement of any use.

6 Claims, 7 Drawing Sheets

FOLDING BICYCLE

BACKGROUND OF THE INVENTION

The bicycle of folding type have become more and more popular nowadays. But several disadvantages still exist therein. Some of them have too complicated folding mechanism causing a high cost as well as a high price, and lose the popularity in marketing. Some other have poor structure and were subject to the possibility of coming apart unexpectedly due to wear and tear of their engaging portions and operation of the folding mechanism wherein the folding of bicycle often can not be easily done, and the safety of use can not be insured.

Therefore, the primary object of the present invention is to provide a folding bicycle with improved hinge mechanism for frame assembly which make it possible to unfold the frame assemblies and put the bicycle into a riding position easily and quickly.

Another object of the present invention is to provide a folding bicycle which is adapted to it frame structure fixed with absolute rigidity and safety when they are secured in the riding position.

A further object of the present invention is to provide a folding bicycle which can be folded in type of that two handle bars are ridden astride both the front wheel and the rear wheel when two handle bar structure are folding downwordly and the main pedal sprocket and the sprocket chain are protected by the front and the rear wheels so as to achieve a compact and portable structure.

BRIEF DESCRIPTION OF THE DRAWINGS

FIG. 4A and FIG. 4A-1 show a hinge mechanism of the present invention in a locking position;

FIG. 4B and FIG. 4B-1 show the hinge mechanism of FIG. 4A in a locking position with the controlling member already pulled up and the rear hinge member ready to be opened from the front hinge member;

DETAILED DESCRIPTION OF THE PREFERRED EMBODIMENT

Figure 1:
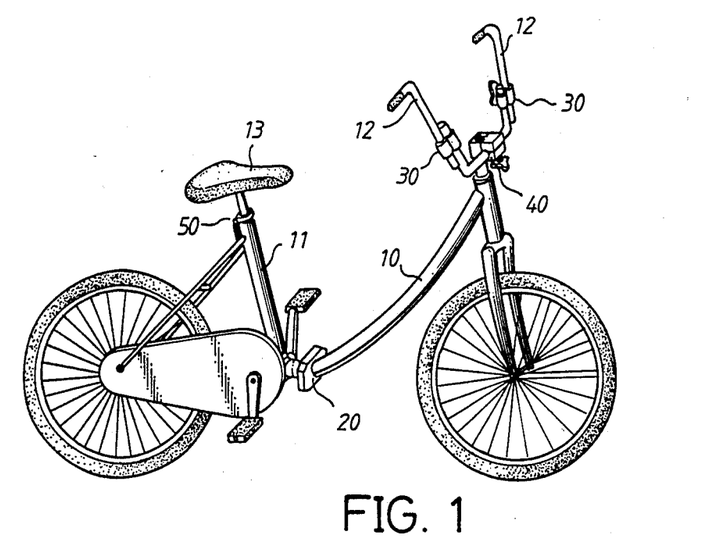
FIG. 1 is a perspective view of a folding bicycle in riding position according to the present invention.
Figure 2:
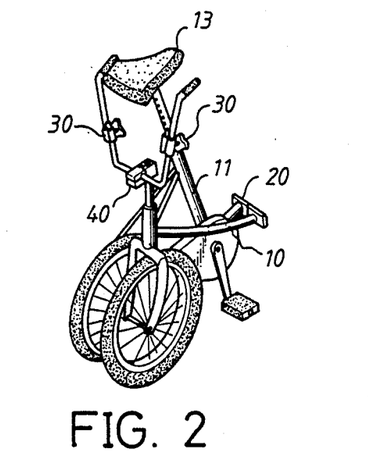
FIG. 2 shows a perspective view of a folding bicycle in folded up position of FIG. 1, showing the main frame of the bicycle to be folded about a folding hinge mechanism.
Figure 3:
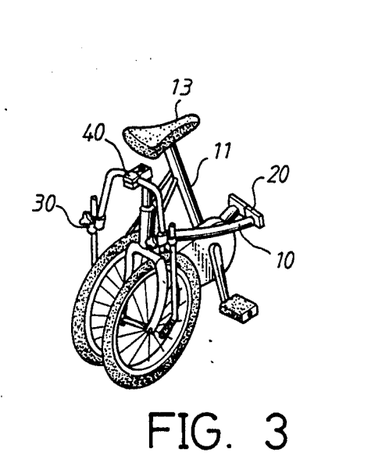
FIG. 3 shows a perspective view of a folding bicycle in the further folded up position of FIG. 1, showing the folded position of the handle-bar and the saddle.

Referring first to FIG. 1, an improved folding bicycle of the present invention comprises a folding hinge mechanism 20 provided between the front frame 10 and the rear frame 11, a set of foldable handle-bar with a first adjusting device 30 and a second adjusting device 40 and a collapsible seat structure 50. When it is unlocked, the bicycle can be folded about the folding hinge mechanism 20 as shown in FIG. 2, which can be folded in such position that the front and rear wheels have central paralled aligned axes to enable convenient rolling of the bicycle on the ground or other supporting surface, and the handle-bar can be further rotated down to ride astride both the front wheel and rear wheel as shown in FIG. 3. In this way, it will be seen from FIG. 3 that the pedal sprocket and the sprocket chain are protected by the front and the rear wheels and said front and rear wheels are then protected by said folded down handle-bar and moreover, when the saddle is lowered its height, it will just put on the top of said handle-bar to thereby protect the handle-bar also.

Figure 4A:
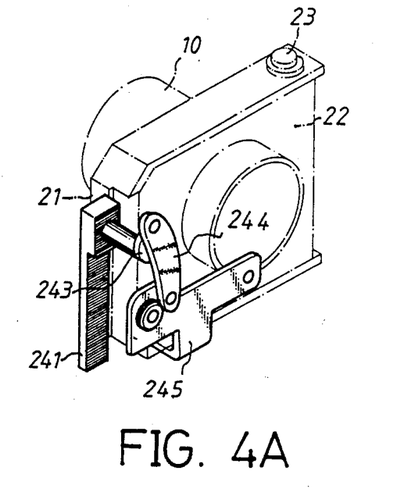
Figure 4A:
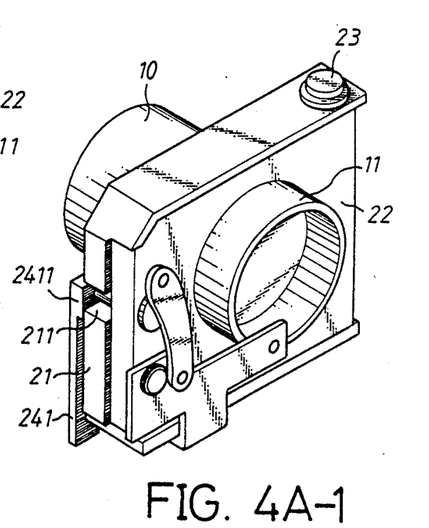
Figure 4B:
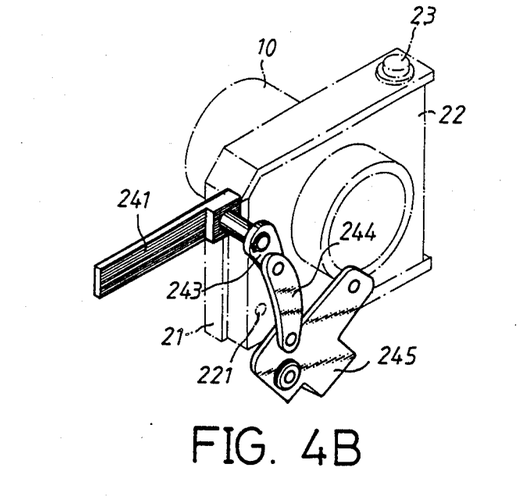
Figure 4B:
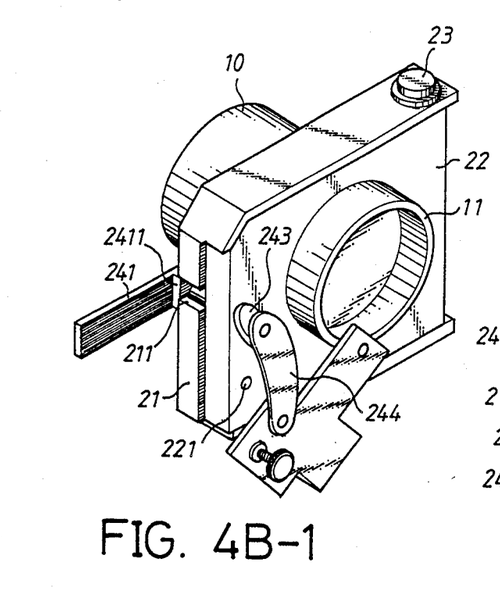
Figure 4C:
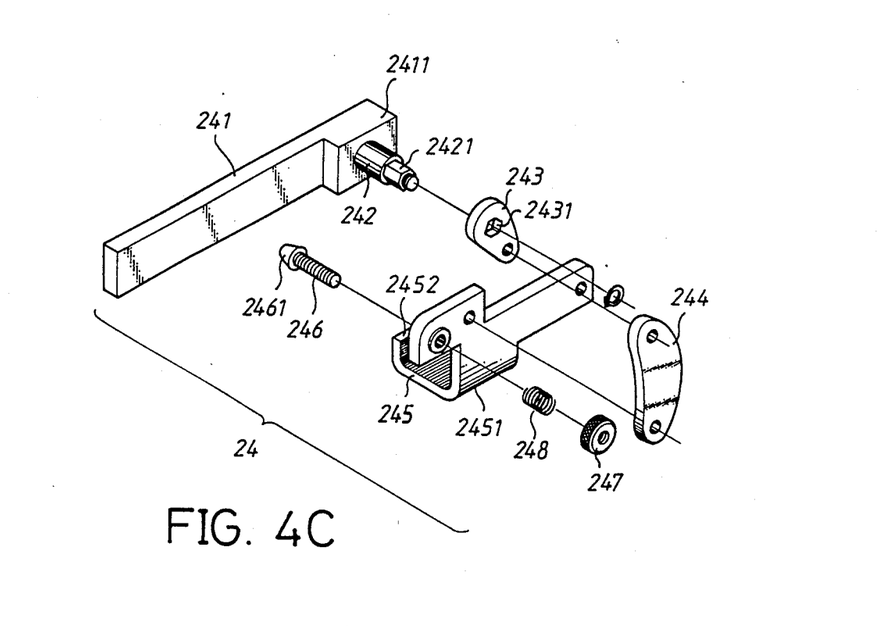
FIG. 4C is an exploded perspective view of the securing assembly of the hinge mechanism of FIG. 4A.

Referring now to FIGS. 4A, 4B and 4C, the present folding hinge mechanism 20 includes a front hinge member 21 and a rear hinge member 22 hinged together by a hinge pin 23. Especially, a set of securing assembly 24 is rotatably mounted on the rear hinge member 22, having a channel body 245 hinged to the rear hinge member 22, a double eccentric member 244 hinged to the channel body 245 at its lower eccentric holes, a cam member 243 having a hexagonal hole 2431, hinged to the upper eccentric hole of the double eccentric member 244 with the lower eccentric hole, and a stepped controlling member 241 having a thicker head portion 2411 with an axially projecting rod 242 having a hexagonal portion 2421. The projecting rod 242 penetrates through the rear hinge member 22 to be bolted to the cam member 243 with the hexagonal portion 2421 received in the hexagonal hole 2431 thereof for driving the above linked members to secure the front hinge member 21 to rear hinge member 22.

Figure 4D:
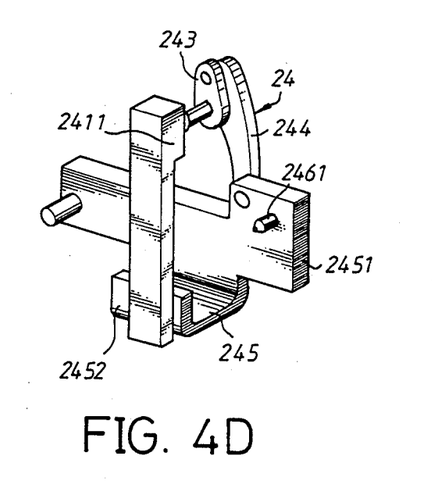
FIG. 4D is an assembled view of the securing assembly of the hinge mechanism of FIG. 4A.
Figure 5A:
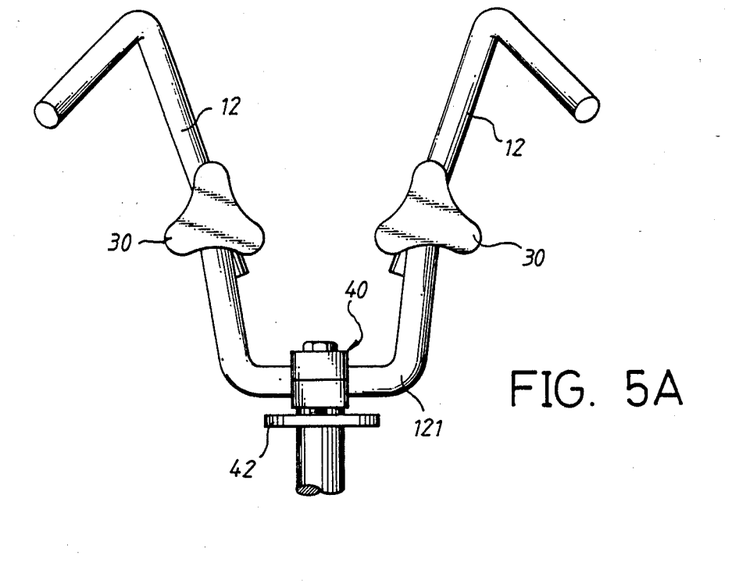
FIG. 5A shows a front view of a foldable handle-bar with adjusting devices.
Figure 5B:
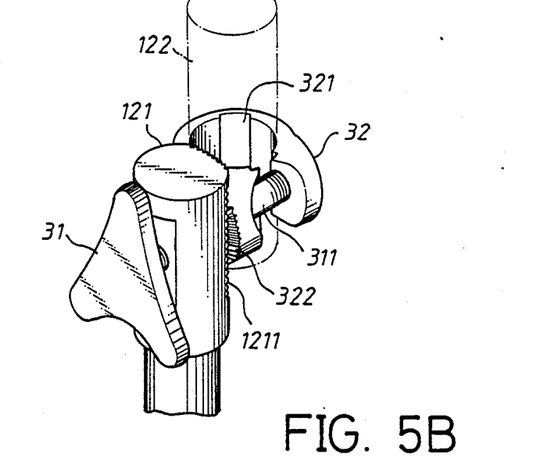
FIG. 5B and FIG. 5C show a perspective view of the foldable handle-bar with first adjusting device in two different directions.
Figure 5C:
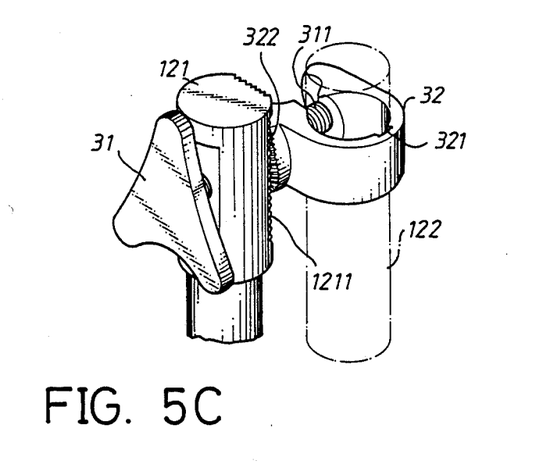
Figure 5D:
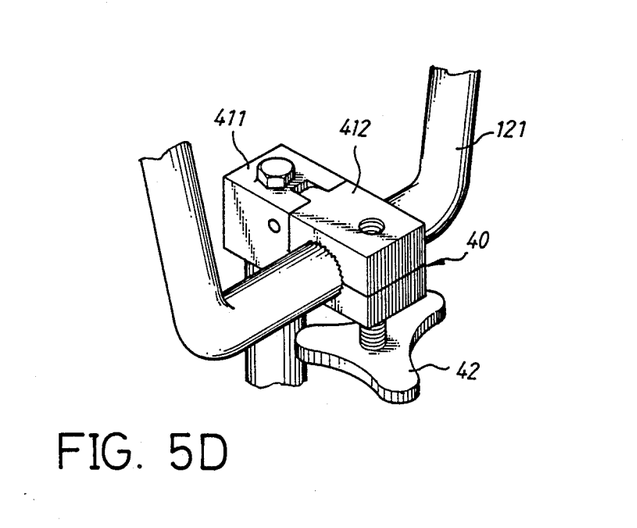
FIG. 5D shows a perspective view of the foldable handle-bar with second adjusting device.
Figure 5E:
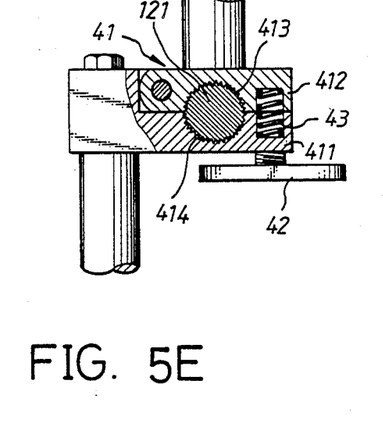
FIG. 5E and FIG. 5F show the operation of the second adjusting device according to FIG. 5D.
Figure 5F:
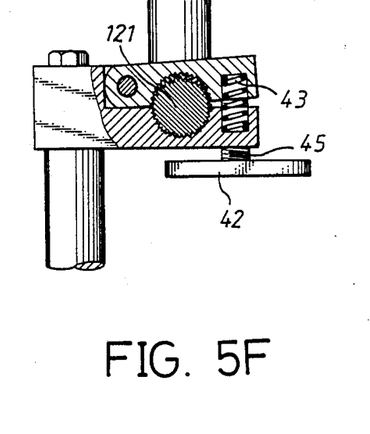

The detailed operation of the above securing assembly 24 will be described below. Referring to FIG. 4B-1, a recess 211 provided at the edge portion of said front hinge member 21 corresponding to the head portion 2411 of the controlling member 241, when the controlling member 241 is set horizontally, the front hinge member 21 can be rotated or opened from the rear hinge member 22 with its recess 211 just passing through the head 2411 of controlling member 241. Then, through rotating the controlling member 241 downward, the cam member 243 is rigidly urged to pull the double eccentric member 244, and in turn the channel body 245 upward to securely clamp the front and rear hinge members 21, 22 together. Furthermore, as shown in FIGS. 4C and 4D, a locking pin 246 having a polished tapered pin tip 2461 and an enlarged pin cap 247 is mounted through the channel body 245, going through an extensive spring 248 connecting the pin cap 247 to the channel body 245, and a corresponding locking holes 221, is located at the rear hinge member 22 (see FIG. 4B), thus, when the channel body 245 is pulled upward with the controlling member 241 rotated downward to clamp the rear and front hinge members 22, 21 together, the locking pin 246 is retracted by the bottom of rear hinge member 22 with its polished tapered tip 2461 opposing there against until the controlling member 241 reaches an exactly vertical position, at the same time, the channel body 245 totally rises to its horizontal position and the locking pin 246 simultaneously coincides with the corresponding locking holes 221 in height and is therefore promptly pushed back by the extensive spring 248, extending through the locking holes 221, to prevent the controlling member 241 from rotating back to the horizontal position. Therefore, the front hinge member 21 is securely engaged with the rear hinge member 22 by the channel body 245 as well as the thicker head portion 2411 of the controlling member 241 and the cam member 243.

To release the front hinge member 21 from the rear hinge member 22, the pin cap 247 must be pulled outward against the spring 248 manually to unlock the controlling member 241 which can be in turn pulled upward to a horizontal position, permitting the front hinge member 21 to be opened from the rear hinge member 22 without obstruction.

Furthermore, two sets of newly designed handl-bar adjusting devices 30 and 40 can be seen from FIGS. 5A to 5F. The first device 30 includes a grip-clamping member 32 having a set of grooves 321 located on its inner surface for increasing the clamping force and an adjusting bolt 311 having an adjusting cap 31. The adjusting bolt 311 penetrates through the supporter 121 to associate with the grip-clamping member 32. The adjusting bolt 311 can be screwed forward to extend the clamping member 32, loosening the grip for height-adjustment. Furthermore, a set of radial tooth-grooves 322 are provided on the supporter-contacting surface of the clamping 32 to engage with the corresponding tooth-grooves 1211 disposed on the surface of the supporter 121 for enhancing the supporting force. When the adjusting bolt 311 is screwed away, the clamping member 32 can seperate from supporter 121 to rotates an angle of 360. As a result, the grip can be adjusted in height and angle to meet the requirement of any rider. As shown from FIGS. 5D to FIG. 5F, the second handle-bar adjusting device 40 includes a stationary body 411 having a grooved semi-circular hole 414 and a movable body 412 having a corresponding grooves semi-circular hole 413, rotatably connected to the stationary body 411. (The most suitable groove depth will be between 1 mm and 1.2 mm). An adjusting bolt 45 having a cap 42 is used to secure the movable body 412 to stationary body 411 to closely clamp the correspondingly handle-bar supporter 121. A spring 43 is further disposed around the adjusting bolt 45 between the movable and stationary bodies 412, 411, thus, when the adjusting bolt 45 is screwed away from the movable body 412, the spring 43 can automatically lift the same up for adjusting any desired angle of handle-bar.

Figure 6A:
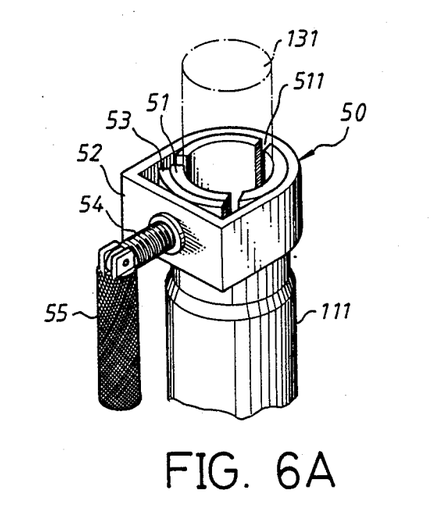
FIG. 6A shows a perspective view of a foldable seat post for supporting saddle.
Figure 6B:
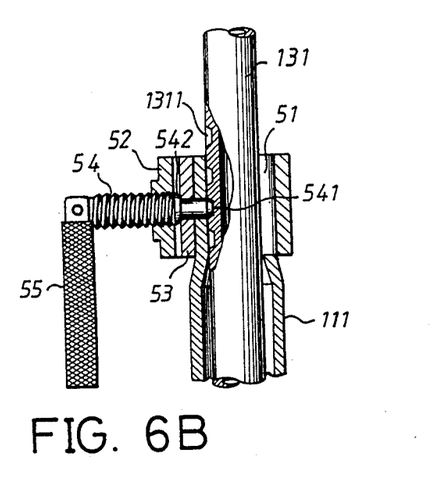
FIG. 6B and FIG. 6C show a sectional view of the operation of seat post of FIG. 6A.
Figure 6C:
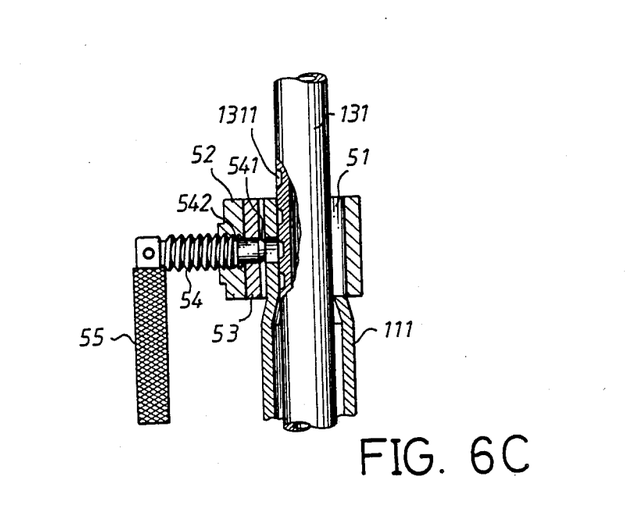

Referring now from FIGS. 6A to FIG. 6C, the seat structure adjusting device 50 of the present invention includes an inner clamping body 51 having several longitudinal grooves 511 for increasing the clamping force, an outer clamping body 52 disposed around the inner one, and a protective pad 53 disposed between the inner and outer clamping bodies 51, 52 for enhancing the supporting strength. An adjusting bolt 54 having a controlling handle 55 and a stepped tip 541 can be screwed through the outer clamping body 52, the protective pad 53, and the inner clamping body 51 to compress the seat post 131 with its stepped tip 541 extending into the serial recesses 1311 of the seat post 131 and the shoulder 542 opposing against the protective pad 53, thus, the seat post 131 can be fitly clamped inside the inner clamping body 51. Reversely, when the adjusting bolt 54 is screwed outward to loosen the seat post 131, it can be adjusted in height as requirements.

With the above arrangement, the present folding mechanism can provide the folding bicycle for a safe, convenient securing effect to insure the safety of use and facilitate the operation. Additionally, the handlebar and saddle adjusting device can further provide different users for various use dimentions to meet their requirments.

We claim:

1. An improved folding bicycle comprising a folding hinge mechanism, having a rear hinge member connected to the rear bicycle frame and a front hinge member connected to the front bicycle frame, both hinge members being hinged together, which comprises:
   a securing assembly including a channel body rotatably mounted on said rear hinge member, capable of closely clamping said front hinge member and rear hinge member together; and a double eccentric member being hinged to said channel body at its lower eccentric holes; and a cam member having a upper hexagonal hole and a lower eccentric hole, being hinged to said double eccentric member with its lower eccentric hole; and
   a controlling member having a head portion with an axially projecting rod having a corresponding hexagonal portion, which penetrates through said rear hinge member to be bolted to said cam member with said hexagonal portion received in said upper hexagonal hole thereof for driving said channel body to securely clamp said front hinge member and said rear hinge member together.

2. A folding hinge mechanism of the folding bicycle as defined in claim 1, wherein:
   a recess corresponding to said head portion of said controlling member is disposed on said front hinge member, thus, when said controlling member is set in a horizontal position, the front hinge member can rotated to overlap said rear hinge member with said recess just passing through said head portion of said controlling member; and
   said controlling member can be rotated from a horizontal position down to a vertical position, rigidly urging said cam member to pull said double eccentric member, and in turn said channel body upward to securely clamp said front and rear hinge members together.

3. A folding hinge mechanism of the folding bicycle as defined in claim 2, wherein:
   a locking pin having a polished tapered pin tip and an enlarged pin cap is mounted through said channel body, and an extensive spring connecting said pin cap to the channel body is disposed around said locking pin; and
   a corresponding locking hole is provided on said rear hinge member, thus, when said channel body is pulled upward with said controlling member rotated downward, said locking pin is retracted by the bottom of rear hinge member with its polished tapered tip opposing thereagainst until said controlling member reaches an exactly vertical position, at the same time, said channel body totally rises to a preset horizontal position and said locking pin simultaneously coincides with said corresponding locking hole in height and is therefore promptly pushed back by said extensive spring to extend through said locking hole, preventing said controlling member from rotating back to said horizontal position.

4. A folding hinge mechanism of the folding bicycle as defined in claim 3, wherein:
said pin cap of said locking pin can be pulled outward against said extensive spring manually to release said controlling member; and
said head portion of said controlling member can be changed into any other shape.

5. An improved folding bicycle as defined in claim 1, wherein upon being folded said bicycle, the main frame of the bicycle is folded about said folding hinge mechanism and the front wheel and rear wheel have central parallel aligned axes to enable convenient rolling the bicycle on the ground.

6. An improved folding bicycle as defined in claim 5, wherein when said folding hinge mechanism is in unlocking position, the pedal sprocket and sprocket chain are sandwiched by said front wheel and rear wheel, and when the handle-bar is rotated down, said both front and rear wheels are protected by the folded down handle-bar, and when the seat post is collapsed down, its saddle will put on the top of said handle-bar to thereby form a compact and protective folded structure.

* * * * *